(12) United States Patent
Aksay et al.

(10) Patent No.: US 6,494,945 B2
(45) Date of Patent: Dec. 17, 2002

(54) PLASTICALLY DEFORMABLE AQUEOUS CERAMIC SLURRIES AND METHODS OF MAKING SUCH COMPOSITIONS

(75) Inventors: Iihan A. Aksay, Princeton, NJ (US); Hsieng Lang, Myrtle Beach, SC (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 10/131,330

(22) Filed: Apr. 24, 2002

(65) Prior Publication Data

US 2002/0117083 A1 Aug. 29, 2002

Related U.S. Application Data

(62) Division of application No. 09/404,004, filed on Sep. 23, 1999.

(51) Int. Cl.$^7$ .......................... C04B 35/10; C04B 35/101
(52) U.S. Cl. ...................... 106/287.17; 501/1; 501/153
(58) Field of Search ........................ 106/287.17, 287.23, 106/287.32, 287.35; 501/1, 153

(56) References Cited

PUBLICATIONS

CA111:64759, Esumi et al, "Interaction between . . . " 1989.*
CA112:126031, Esumi et al, "Mixed bilayers of anionic and nonionic surfactants on alumina", 1990.*
Esumi et al, "Mixed Surfactant Bilayers on Monodispersed Ferric Oxide Hydro Sols", Bull. Chem. Soc. Japn. pp. 1475–1478, 1988.*
Bergstrom, et al., "Consolidation Behavior of Flocculated Alumina Suspensions," J. Am. Ceram. Soc., 75 [12] 3305–14 (1992).
Esumi, et al., "Mixed Bilayers of Anionic and Nonionic Surfactants on Alumina," J. Colloid Interface Sci.(1990), 134(1), 283–8.
Esumi, et al., "Interaction Between Disodium 1, 14–tetradecanediyl Disulfate and Sodium Dodecyl Sulfate or Poly (oxyethylene) Nonyl Phenyl Ether on Alumina," Bull. Chem. Soc. Jpn. (1989).
Esumi, et al., "Photochromism of Spiropyan in Surfactant Bilayer on Colloidal Silica," Shikizai Kyokaishi (1991), No month provided, 64(9), 580–3.
Esumi, et al., "Cationic Surfactant Adsolubilization of 2–Naphthol and Naphthalene With Titanium Dioxide Having a Dodecyl Chain," J. Colloid Interface Sci. (1997), No month provided, 193(2), 315–318.
Esumi, etsal., "Competitive Adsorption of Cationic Surfactant and Pesticide on Laponite," Colloids Surf., A (1998), 135(1–3), 59–62.
Luther, et al., "The Development of Short–Range Repulsive Potentials by Short–Chain Surfactants in Aqueous Si3N4 Slurries," J. Am. Ceram. Soc., 82 [1] 74–80 (1999), No month provided.
Nagahama, et al., "Adsolubilization in Cationic Surfactant Bilayer Formed on Silica," Shikizai Kyokaishi (1991), No month provided, 64(6), 366–72.

\* cited by examiner

*Primary Examiner*—David Brunsman
(74) *Attorney, Agent, or Firm*—Wolff & Samson

(57) ABSTRACT

A plastically deformable aqueous ceramic slurry wherein the ceramic particles have on the surfaces thereof a closely-packed anionic surfactant bilayer or an anionic/nonionic surfactant bilayer.

Such slurries are produced by:
  a) dispersing an amount of ceramic particles in an amount of water to form an aqueous ceramic slurry;
  b) adding an amount of an anionic surfactant or a mixture of an anionic surfactant and nonionic surfactant to such slurry;
  c) adjusting the pH value of such slurry to adsorb on the ceramic particle surfaces a closely-packed anionic surfactant bilayer or anionic/nonionic surfactant bilayer.

Preferably a mixture of surfactants is used, with a mixture of anionic and nonionic surfactants being highly preferred. Examples of preferred combinations are mixtures of the anionic surfactant SDS and a nonionic surfactant selected from octylphenol polyether alcohols (OPE), in particular $C_8H_{15}Ph(EO)_R$ wherein R was 3, 5, 9.5 and 12.5.

The dispersed or weakly flocculated ceramic suspensions can then be packed by high density centrifugation or pressure filtration to form consolidated ceramic cakes which are plastic and extrudable allowing them to be shaped into complicated structures by various plastic forming methods.

4 Claims, 5 Drawing Sheets

PLASTICALLY DEFORMABLE AQUEOUS CERAMIC SLURRIES AND METHODS OF MAKING SUCH COMPOSITIONS

RELATED APPLICATIONS

This is a divisional application of U.S. patent application Ser. No. 09/404,004 filed Sep. 23, 1999, the entire disclosure of which is expressly incorporated herein by reference.

BACKGROUND OF THE INVENTION

1. Field of the Invention

This invention relates to plastically deformable aqueous ceramic slurries and methods of making such compositions. In particular, this invention relates to making aqueous ceramic slurries or mixtures of oxide and nonoxide ceramic particles that demonstrate a high degree of plasticity to enable such compositions to be formed or shaped into useful articles or structures having intricate shapes by conventional plastic deformation processes, e.g., injection molding and extrusion.

2. Prior Art

Plastic-forming methods, such as injection molding and extrusion, are essential to fabricating ceramic objects with intricate shapes. While known mixtures of clay and water are plastic and can be easily formed into useful shapes, aqueous slurries of advanced ceramics do not show such plasticity.

Typically, to obtain a plastically deformable ceramic composition of nonplastic ceramic powders dispersed in a carrier medium, binders are added to the composition. For example, Mutsuddy, "Injection Molding," pp. 173–80 in Engineered Materials Handbook Vol.4, Ceramics and Glasses, ASM Int., 1991, describes making such plastically deformable ceramic compositions by adding clay, a polymer solution, and thermal plastics to the ceramic composition. There are several problems associated with such compositions. In particular, adding clay into the formulation changes the final composition, thus limiting the applications for the ceramic materials, the removal of the polymeric binders tends to induce defects in the ceramic product that is produced and the use of such polymeric binders can create health and environmental risks.

Berström et al., "Consolidation Behavior of Flocculated Alumina Suspensions," J. Am. Ceram. Soc., 75 [12] 3305–14 (1992) attempted to overcome these problems by endowing plasticity to ceramic slurries through the control of the interparticle forces. This was done by modifying the surface of the alumina powders by adsorbing a monolayer of fatty acid in decaline. Bergström et al. demonstrated that when the chain length of the adsorbed fatty acid reached a critical value, the resulting interparticle forces consisted of weakly attractive forces that became strongly repulsive forces at shorter interparticle separations. The suspensions produced by Bergström et al. could be packed to high density (~60 vol % solids loading) by centrifugation and the cakes produced by such centrifugation were plastic and extrudable. See also, Schilling, et. al., "Particle Attraction Effects on the Centrifugal Casting and Extrusion of Alumina"; pp. 35–51 in Handbook on Characterization Techniques for the Solid-Solution Interface. Edited by J. H. Adair, J. A. Casey, and S. Venigalla. Am. Ceram. Soc., Westerville, Ohio, 1993. However, although these formulations had certain advantages over, for example, the compositions of Mutsuddy, they can only be formulated with nonpolar organic solvents, which posehealth and environmental risks.

In order to avoid such risks, attempts have been made to induce plasticity to aqueous slurries of advanced ceramics by using "hydration forces" or a lipid bilayer. Velamakanni, et al., "New Method for Efficient Colloidal Particle Packing via Modulation of Repulsive Lubricating Hydration Forces", Langmuir 6 1323–25 (1990). E. P. Luther, et. al., "The Development of Short-Range Repulsive Potentials by Short-Chain Surfactants in Aqueous $Si_3N_4$ Slurries", submitted to the Journal of the American Ceramic Society. However, the consolidated slurries were either nonextrudable Schilling, et. al. or fluid-like Luther, et. al.

Additionally, it is known that ceramic particles can be dispersed in water by the adsorption on the particles of an ionic/nonionic surfactant bilayer. Somasundaran et al., "Coadsorption of anionic and nonionic surfactant mixtures at the alumina-water interface.," Langmuir 8 [4] 1065–69 (1992); Fu et al, "Thermodynamic Study of Adsorption of Anionic-Nonionic Surfactant Mixture at the AluminaWater Interface," pp. 366–76 in Mixed Surfactant Systems, ACS symp. Series 501. Edited by P. M. Holland and D. N. Rubingh, Amer. Chem. Soc., Washington, D.C., 1992; and Esumi et al, "Mixed bilayers of anionic and nonionic surfactants on alumina.," J. Colloid Interface Sci. 134 [1] 283–88 (1990).

OBJECTS AND SUMMARY OF INVENTION

It is an object of this invention to provide a plastically deformable aqueous ceramic slurry.

It is a further object of this invention to provide aqueous slurries of ceramics that can be molded into intricate shapes by injection molding or extrusion.

It is yet another object of this invention to provide ceramic slurries that can be molded into intricate shapes by injection molding or extrusion, but do not use polymeric binders, thus reducing defects in the final ceramic product and reducing health and environmental risks caused by the use of such binders.

It is still another object of this invention to provide such ceramic slurries without using nonpolar organic solvents, thereby reducing the health and environmental risks caused by the use of such solvents.

All of the foregoing objects are obtained by the plastically deformable aqueous ceramic slurries of this invention wherein the ceramic particles have on the surfaces thereof a closely-packed anionic surfactant bilayer oran ionic/nonionic surfactant bilayer. Optionally, such ceramic particles have on the surfaces thereof a closely-packed cationic surfactant bilayer or a cationic/nonionic surfactant bilayer. Such slurries are produced by:

a) dispersing an amount of ceramic particles in an amount of water to form an aqueous ceramic slurry;

b) adding an amount of an anionic surfactant or a mixture of an anionic surfactant and nonionic surfactant to such slurry;

c) adjusting the pH value of such slurry to adsorb on the ceramic particle surfaces a closely-packed anionic surfactant bilayer or anionic/nonionic surfactant bilayer.

Optionally, a cationic surfactant may be used instead of an anionic surfactant. Preferably a mixture of surfactants is used, with a mixture of anionic and nonionic surfactants being highly preferred. Examples of preferred combinations are mixtures of the anionic surfactant (SDS) and a nonionic surfactant selected from octylphenol polyether alcohols (OPE), in particular $C_8H_{15}Ph(EO)_R$— wherein R was 3, 5, 9.5 and 12.5.

Both the pH value and surfactants are selected so that the formed bilayer is tenaciously adsorbed onto the ceramic particle surface.

The dispersed or weakly flocculated ceramic suspensions can then be packed by high density centrifugation or pressure filtration to form consolidated ceramic cakes which are plastic and extrudable allowing them to be shaped into complicated structures by various plastic forming methods.

The compositions and processes of this invention are advantageous in that water is used instead of organic solvents, thus minimizing environmental and health hazards, the total amount of organic additives used is generally less than 1 wt % of the ceramic slurry, thus reducing costs and avoiding problems associated with binder burnout; and the surfaces of the ceramic particles are coated with hydrophobic layers, allowing aqueous colloidal processing of water-sensitive ceramic powders.

DETAILED DESCRIPTION OF THE INVENTION

Figure 1:
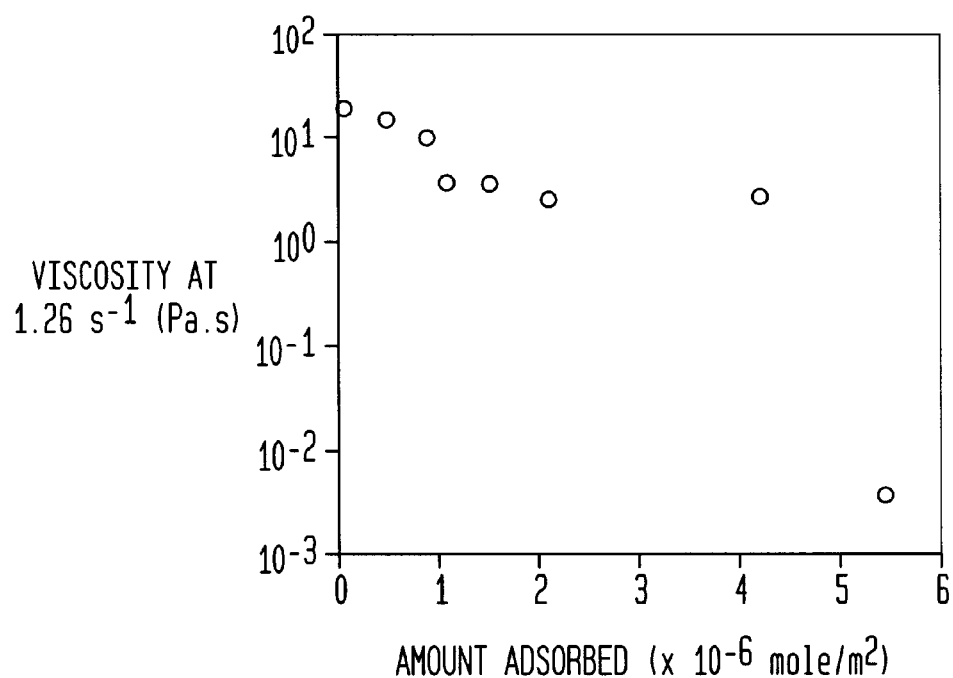
FIG. 1 is a graph of the effect of adsorbed nonionic/anionic surfactants on the viscosities of 15 vol % AKP-30 alumina suspensions at varying adsorption concentrations. Specifically, the suspensions are preadsorbed with 0.01M of SDS and then from 0 to 0.03M of $C_8H_{15}Ph(EO)_5$— is added to the composition.

One aspect of this invention is directed to a plastically deformable aqueous oxide ceramic slurry. Plasticity of the oxide ceramic slurry is not achieved as in known methods, by the use of a polymeric/plastic medium. Plasticity of the aqueous oxide ceramic slurry is induced by controlling the interparticle forces (van der Waals attraction, steric repulsion, electrostatic repulsion, etc.) in such a way that weakly attractive secondary minimum forces provide sufficient cohesive forces between the oxide ceramic particles and strong repulsion forces prevail when the particles are close together to provide lubrication between the particles when they contact each other. This effect is achieved by the adsorption of surfactant bilayers on the surfaces of the oxide ceramic particles.

More specifically, depending upon the isoelectric point of the oxide ceramic powders, a suitable working pH is selected so that the ceramic particle surface and the first selected ionic (anionic or cationic) surfactant are oppositely charged. The adsorption of the first ionic surfactant on the particle forms a monolayer thereon through the electrostatic attraction between the head groups of the ionic surfactant and the oppositely charged sites on the oxide ceramic particle surface and the hydrophobic interaction between the hydrophobic hydrocarbon chains of the surfactants and the surrounding water. Subsequently, a nonionic surfactant is adsorbed thereon to form a closely packed second layer, i.e., bilayer, through the synergistic interactions of the surfactants.

Bergström et al. previously demonstrated that by adsorption of a closely packed fatty acid on alumina particle surface in decaline, the interparticle forces could be varied from strongly flocculated to weakly flocculated by increasing the chain length of the fatty acids. Bergström et al. also demonstrated that a with a monolayer of oleic acid adsorbed on alumina, the oxide ceramic suspension could be packed to a relatively high density (60 vol %) by centrifugation. The consolidated alumina cake was plastic and could be extruded. As indicated, however, this invention is an improvement over the work of Bergström et al in that the inventors have achieved slurrys of unexpectedly high plasticity using aqueous suspensions of oxide ceramics.

Applicant's results are unexpected because of the difficulty in using aqueous oxide ceramic suspensions to apply a useful monolayer due to the similar polarity of the oxide ceramic powder surface and the aqueous suspension medium. It is hypothesized that in this invention, for example, when an ionic surfactant (anionic or cationic) molecule, is absorbed on an oxide ceramic surface the charged functional group is attached to the ceramic particle surface and the hydrophobic hydrocarbon chain is exposed to the water. When such ceramic particles are "hydrophobed" in such a manner, the suspension becomes strongly flocculated due to the hydrophobic interaction of the particles. An ionic surfactant bilayer can be formed at higher concentrations (~critical micelle concentration) with the charged polar groups exposed to the water, thus rendering the surface hydrophilic. On the other hand, nonionic surfactants, such as octylphenol polyether alcohols, do not have significant adsorption on alumina surface in water, except at extremely high concentrations. Rosen, *Surfactants and Interfacial Phenomena*, 2nd Ed. John Wiley & Sons, New York, 1989.

When nonionic surfactants were added to ceramic surface previously flocculated by addition of an anionic surfactant, the flocculated ceramic suspension redispersed by forming mixed bilayers in such a manner that the hydrophobic chains of the nonionic surfactants were in contact with the anionic surfactant-covered alumina and their hydrophilic groups toward the aqueous phase. Previous studies on the surfactant mixture primarily focused on adsorption behavior and its use as a dispersant for which nonionic surfactants with longer hydrophilic chain length were preferred. See also, U.S. Pat. No. 5,316,577 to Wu.

The invention described and claimed herein permits varying the hydrophilic chain length of the nonionic surfactant to determine the preferred chain length wherein a weakly-flocculated suspension can be formed and consolidated to a plastically deformable slurry with high packing density. In a preferred embodiment SDS was used as the anionic surfactant with nonionic octylphenol polyether alcohols (OPE). The OPEs used were composed of a hydrophobic octylphenol chain and hydrophilic polyethylene oxide chains containing average ethylene oxide units between 1 and 12.5, i.e., $C_8H_{15}Ph(EO)_x$— wherein x=1 to 12.5.

Referring to the Figures herein and the examples used to create the data for such Figures, suspensions were prepared by mixing a 15 vol % aqueous AKP-30 alumina suspension with $C_8H_{15}Ph(EO)_5$— or $C_8H_{15}Ph(EO)_{12.5}$— at from 0 to 0.03M, and 0.01M SDS at pH 8.8. The suspensions were then consolidated by centrifuging. The shear viscosities of these suspensions were measured. It was found that when 0.01 M SDS was added into the suspension without OPE surfactants, a strongly flocculated suspension was produced. The extent of the flocculation, as measured by the viscosity and density of the centrifuge cake, was greater than that due to flocculation at IEP. This was considered to be due to the hydrophobic effect. When $C_8H_{15}Ph(EO)_5$— was added into the suspension containing 0.01M SDS, the viscosity decreased as the concentration of $C_8H_{15}Ph(EO)_5$— increased. Of particular note, at 0.03M of $CH_8H_{15}Ph(EO)_5$— the viscosity of the suspension dropped significantly and became close to that of a dispersed suspension. Correspondingly, the packing density of the centrifuge reached its maximum at the same concentration of 0.03M $C_8H_{15}Ph(EO)_5$—. However, this maximum packing density was only 53 vol %. This was due to the fact that (i) at pH 8.8 the surface of alumina does not contain as many positive sites as it would at a lower pH, and (ii) the amount of SDS added was not enough to form a close-packed monolayer on the alumina surface.

Figure 2:
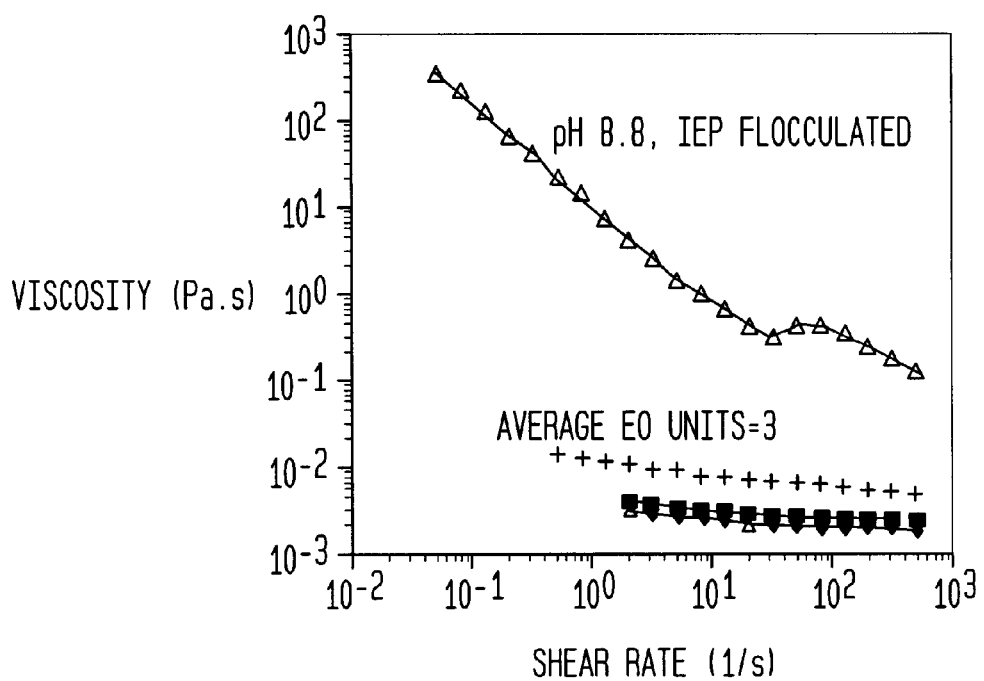
FIG. 2 is a graph of the effect of certain adsorbed nonionic/anionic surfactant bilayers on the viscosities of 15 vol % AKP-30 alumina suspensions kept at a Ph of about 3.8. Also shown in this graph are the viscosities of 15 vol % AKP-30 alumina suspension flocculated at pH 8.8 and that dispersed by electrostatic repulsion. The nonionic surfactant was $C_8H_{15} Ph(EO)_R$— wherein R was 3, 5, 9.5 and 12.5.
Figure 3:
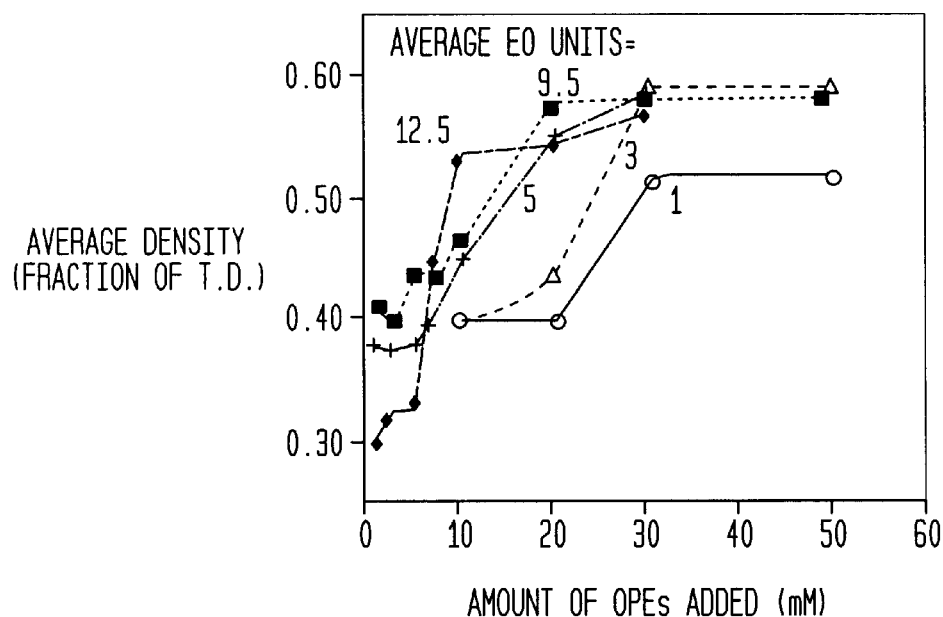
FIG. 3 is a graph of the effect of adsorbed nonionic/anionic surfactant concentrations on the consolidation behavior of 15 vol % AKP-30 suspensions. The initial concentrations of SDS were 0.02M and the amount of OPEs were from 1 to 50 mM.
Figure 4:
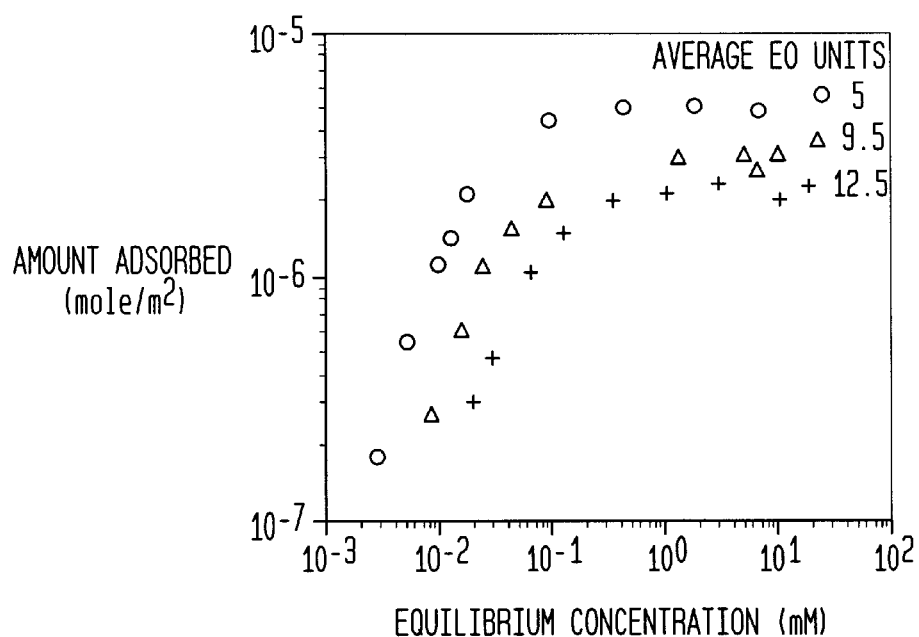
FIG. 4 is a graph of EO chain length, R=5–12.5, on the adsorption octylphenol polyether alcohols (OPE) at about a constant Ph of 3.8. The suspensions contained 0.02M SDS.
Figure 5:
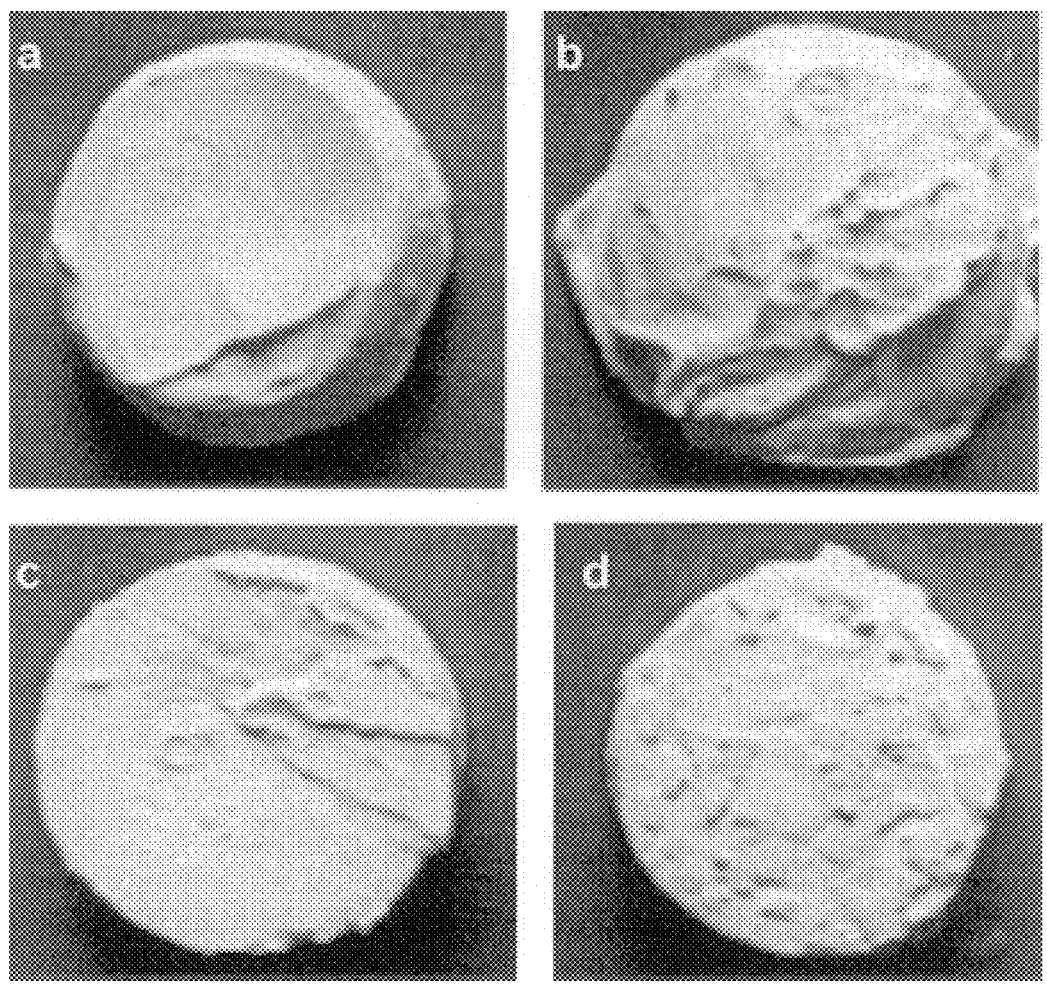
FIG. 5 are photographs of consolidated alumina cakes removed from a mold and dried in air. The cakes are consolidated from suspensions containing one monolayer of SDS and one monolayer of OPEs with different ethylene oxide (EO) units: (a) 3, (b) 5, (c) 9.5 an (d) 12.5.

It was then found that by (i) adjusting the pH to 3.8, and (ii) adding 0.02M of SDS a highly packed slurry was produced. Experiments were carried out using $C_8H_{15}Ph(EO)_{12.5}$—, $C_8H_{15}Ph(EO)_5$— and $C_8H_{15}Ph(EO)_{9.5}$—. Similar behaviors were observed. At plateau adsorption densities of these OPEs, suspensions adsorbed with the SDS/OPE mixtures were dispersed and consolidated to ~60 vol % packing densities, as shown in FIG. 2 and FIG. 3, respectively. The adsorption isotherm studies, as shown in FIG. 4, confirmed that the adsorption densities of SDS and OPEs were close to those close-packed at the air-water interfaces and thus close-packed SDS/OPE bilayers were possibly formed under these conditions. In addition, the zeta potentials of the powders were adsorbed with the SDS/OPE bilayers were close to zero. Therefore, the long-range electrostatic repulsion was negligible. The consolidated cakes, however, were dilatant-elastic at high strain rate and fluid at low strain rate-and thus could not retain shapes without support. It was believed that the EO chain-length of the OPE surfactants were too long so that steric repulsion was sufficient to overcome the van der Waals attraction at all particle separation.

Figure 7:
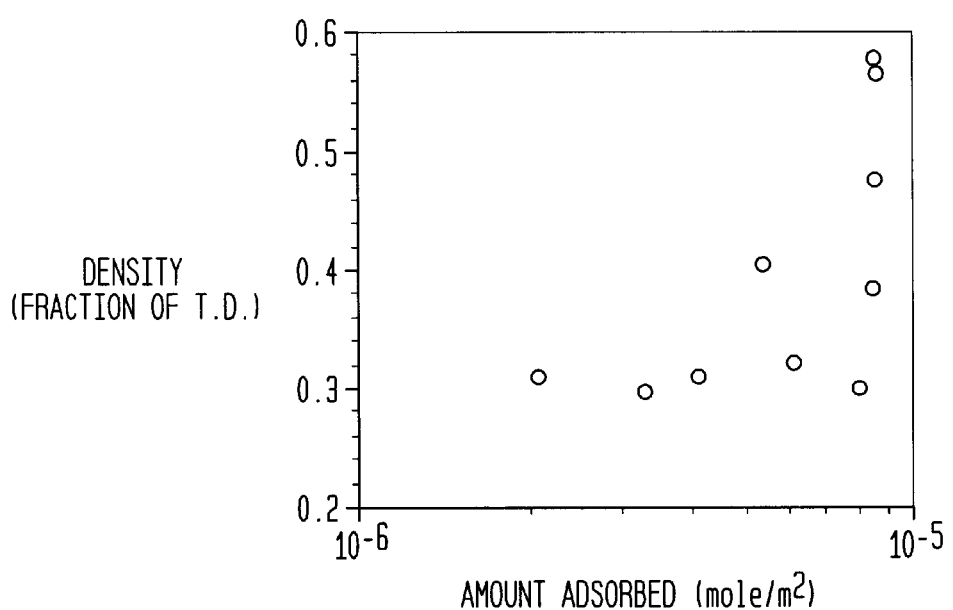
FIG. 7 is a graph of the effect of adding anionic SDS surfactants on the average density of consolidated alumina cakes (expressed in fraction of theoretical density).

To further reduce the range of steric repulsion, it was proposed to use $C_8H_{15}Ph(EO)_1$— and $C_8H_{15}Ph(EO)_3$—. These two surfactants were insoluble in water and the approach seemed impractical. It was considered that, in the presence of adsorbed SDS, the OPES might adsorb by mechanisms similar to adsolubilization. Surprisingly and unexpectedly, upon the addition of the short-chain OPEs to the suspensions containing particles preadsorbed with one monolayer of SDS, the viscosities gradually reduced. However, the viscosities were higher than that of a dispersed one, as shown in FIG. 7. The slurry containing $C_8H_{15}Ph(EO)_3$— was weakly flocculated and its consolidated cake had a packing density of 59 vol %. However, most importantly and unexpectedly, the consolidated cake was plastic. This cake was extrudable and large samples with 2.5" O.D. and 1.5" thickness were prepared and dried without cracking, as shown in FIG. 7.

Figure 6:
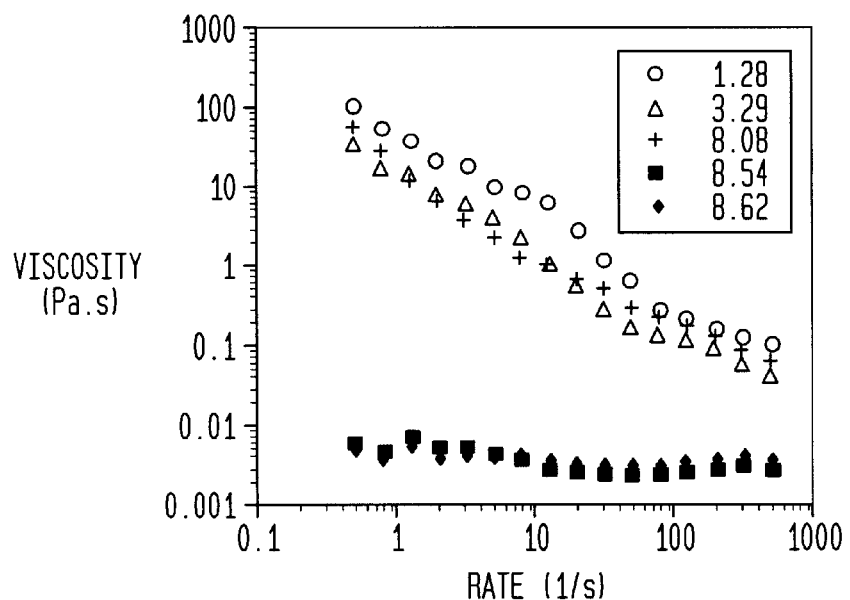
FIG. 6 is a graph of the viscosities of 15 vol % AKP-30 alumina suspensions at varying amounts of adsorbed SDS at about Ph 3.8 and constant temperature (20° C.)

It was also found that by adsorbing an ionic surfactant bilayer on the particle surface that when the amount of added SDS was sufficient such that a close-packed SDS bilayer was formed (adsorption densities $\sim 8.6 \times 10^{-6}$ mole/m$^2$), the suspension became dispersed, as shown in FIG. 6, and the packing densities of the consolidated cakes reached ~58 vol %, as shown in FIG. 7. Quite unexpectedly, the consolidated cakes were also plastic.

Tests were performed on non-oxide ceramics, in particular silicon nitride. Since the isoelectric point of silicon nitride is lower than alumina, cationic surfactants, such as alkyltrimethyl ammonium bromides or dialkyldimethyl ammonium bromides were used instead of the anionic SDS. Behaviors similar to those in the alumina system were observed with some difference.

Figure 8:
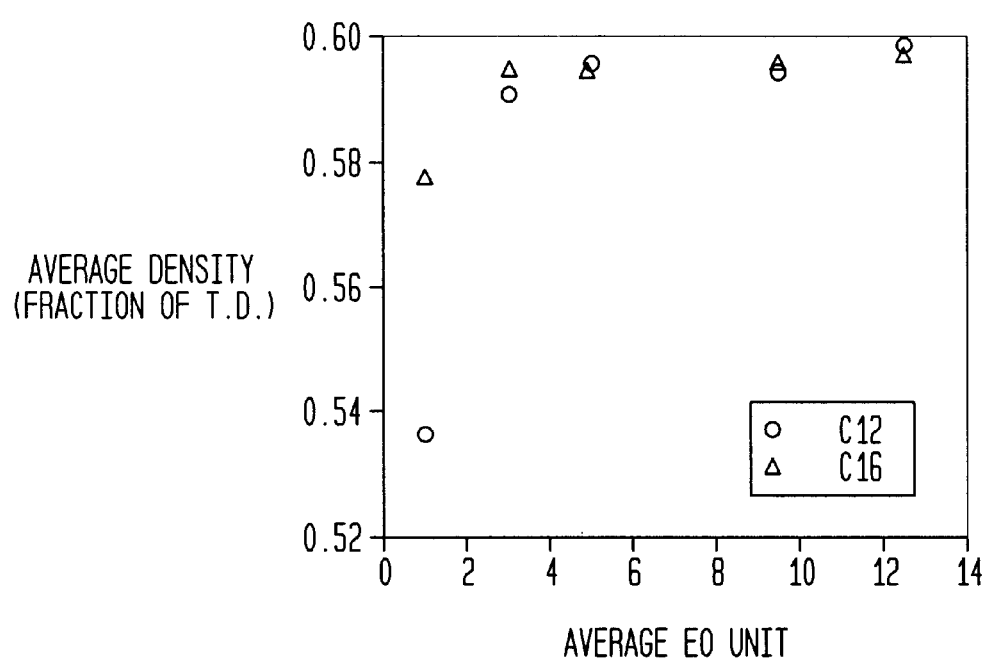
FIG. 8 is a graph of the effect of EO chain length of the OPE surfactants on the packing densities of cakes consolidated from silicon nitride suspensions adsorbed with one monolayer of nonionic OPEs and one monolayer of cationic surfactants, i.e., dodecyltrimethyl ammonium bromide and hexadecyltrimethyl ammonium bromide.

Suspensions were prepared by adsorbing from mixtures of alkyltrimethyl ammonium bromides and OPEs. Weakly flocculated suspensions which can be packed to high densities by centrifuge could be obtained by using mixtures of alkyltrimethyl ammoniumbromides and OPEs with shorter chain length, such as $C_8H_{15}PH(EO)_1$— as shown in FIG. 8, plastic cakes were obtained at lower packing densities (maximum 55 vol %).

Having fully disclosed the preferred embodiment of the invention, it will be apparent to those skilled in the art that various changes and modifications may be made without departing from the broad spirit and scope of the invention as defined in the appended claims.

What is claimed is:

1. A process for producing a plastically deformable ceramic alumina cake comprising:
   a) dispersing an amount of ceramic alumina particles in an amount of water to form an aqueous ceramic alumina slurry;
   b) adding an amount of an anionic surfactant or a mixture of an anionic surfactant and nonionic surfactant to such slurry;
   c) adjusting the pH value of such slurry to adsorb on the ceramic particle surfaces a closely-packed anionic surfactant bilayer or anionic/nonionic surfactant bilayer; and
   d) consolidating the slurry to form a plastically deformable ceramic alumina cake.

2. The process of claim 1, wherein organic additives are less than 1 wt % of the ceramic slurry.

3. The process of claim 1, wherein the aqueous ceramic slurry is an AKP-30 alumina suspension.

4. The process of claim 1, wherein the anionic surfactant is SDS and the nonionic surfactant is $C_8H_{15}Ph(EO)_R$— wherein R is from 5 to 13.

* * * * *

UNITED STATES PATENT AND TRADEMARK OFFICE
CERTIFICATE OF CORRECTION

PATENT NO.     : 6,494,945 B2
DATED          : December 17, 2002
INVENTOR(S)    : Ilhan A. Aksay and Hsieng-Liang Ker It is certified that error appears in the above-identified patent and that said Letters Patent is hereby corrected as shown below:

<u>Title page,</u>
Item [75], please correct the spelling of the inventors' names as follows:
-- Ilhan A. Aksay -- and -- Hsieng-Liang Ker --

Signed and Sealed this

Eighth Day of July, 2003

JAMES E. ROGAN
*Director of the United States Patent and Trademark Office*